(12) United States Patent
Akahane et al.

(10) Patent No.: US 9,476,507 B2
(45) Date of Patent: Oct. 25, 2016

(54) VALVE, PRESSURE CONTROLLING APPARATUS, LIQUID EJECTING APPARATUS, AND METHOD OF OPENING AND CLOSURE VALVE

(71) Applicant: SEIKO EPSON CORPORATION, Tokyo (JP)

(72) Inventors: Fujio Akahane, Azumino (JP); Koji Morikoshi, Shiojiri (JP); Makoto Otsuki, Matsumoto (JP); Ryota Kinoshita, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/944,514

(22) Filed: Nov. 18, 2015

(65) Prior Publication Data

US 2016/0146354 A1    May 26, 2016

(30) Foreign Application Priority Data

Nov. 20, 2014  (JP) .................. 2014-235624

(51) Int. Cl.
| | | |
|---|---|---|
| B41J 2/175 | (2006.01) | |
| F16K 1/42 | (2006.01) | |
| F16K 1/36 | (2006.01) | |
| F16K 27/02 | (2006.01) | |

(52) U.S. Cl.
CPC .............. *F16K 1/42* (2013.01); *B41J 2/17556* (2013.01); *B41J 2/17596* (2013.01); *F16K 1/36* (2013.01); *F16K 27/02* (2013.01)

(58) Field of Classification Search
CPC .............. B41J 2/17556; B41J 2/17566; B41J 2/17596; B41J 2/17513; B41J 2/17523; B41J 2/1752; B41J 2/17553; B41J 2/17509; B41J 2/18
See application file for complete search history.

(56) References Cited

U.S. PATENT DOCUMENTS

| | | | | |
|---|---|---|---|---|
| 5,992,992 A | * | 11/1999 | Gibson | ............... B41J 2/17556 347/94 |
| 2003/0094368 A1 | | 5/2003 | Yamada et al. | |
| 2006/0066695 A1 | * | 3/2006 | Akahane | ............... B41J 2/17509 347/85 |
| 2013/0161422 A1 | | 6/2013 | Miyajima et al. | |
| 2013/0293643 A1 | | 11/2013 | Shinoda et al. | |

FOREIGN PATENT DOCUMENTS

| | | |
|---|---|---|
| JP | 09-174875 | 7/1997 |
| JP | 2003-222606 | 8/2003 |
| JP | 2010-198297 | 9/2010 |
| JP | 2010-208048 | 9/2010 |
| JP | 2010-208049 | 9/2010 |
| JP | 2011-051271 | 3/2011 |
| JP | 2012-086535 | 5/2012 |
| JP | 2013-132894 | 7/2013 |
| JP | 2013-132895 | 7/2013 |
| JP | 2013-249463 | 12/2013 |

\* cited by examiner

*Primary Examiner* — Juanita D Jackson
(74) *Attorney, Agent, or Firm* — Workman Nydegger

(57) ABSTRACT

A valve includes a seat having a through hole through which ink flows and a valve body that is configured to be in contact with the seat to close the through hole such that the valve is in a closed state and to be separate from the seat to open the through hole such that the valve is in an open state. At least one of the seat and the valve body is configured to move relative to the other of the seat and the valve body while the valve is in the closed state.

18 Claims, 7 Drawing Sheets

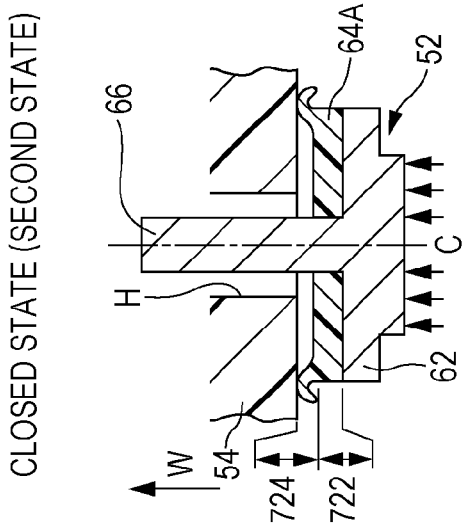
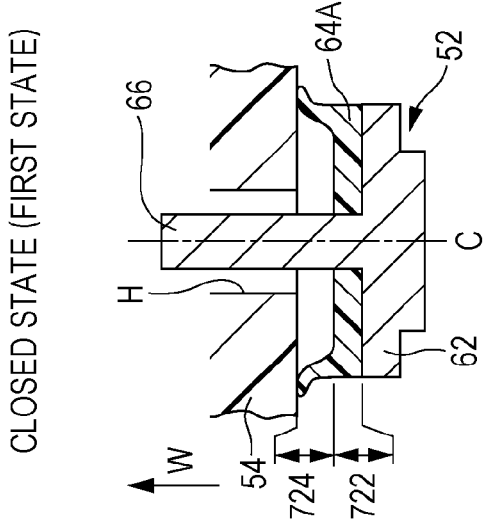
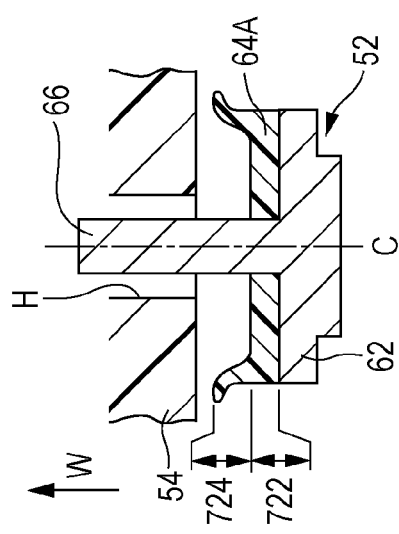

VALVE, PRESSURE CONTROLLING APPARATUS, LIQUID EJECTING APPARATUS, AND METHOD OF OPENING AND CLOSURE VALVE

CROSS REFERENCES TO RELATED APPLICATIONS

This application claims priority to Japanese Patent Application No. 2014-235624 filed on Nov. 20, 2014. The entire disclosure of Japanese Patent Application No. 2014-235624 is hereby incorporated herein by reference.

BACKGROUND

1. Technical Field

The present invention relates to a valve that opens and closes a channel through which a liquid flows and that controls pressure in the channel, and a method of opening and closing the valve.

2. Related Art

A liquid in a liquid reservoir (cartridge) is supplied through a channel to a liquid ejecting head configured to eject a liquid such as ink through a plurality of nozzles, for example. A valve that opens and closes the channel and that controls the pressure in the channel is disposed in the channel extending between the liquid reservoir and the liquid ejecting head. JP-A-2013-132895 discloses a configuration including a channel member having a through hole (communication passage) and a valve body that comes in contact with and moves away from the channel member to open and close the through hole. A contact area of the channel member that is in contact with the valve body changes as the valve body is turned every time the through hole is opened and closed. Thus, a substance contained in the liquid (pigment of the ink, for example) is unlikely to accumulate on the channel member.

In the technology disclosed in JP-A-2013-132895, the accumulation of the substance contained in the liquid is reduced by turning the valve body every time the through hole is opened and closed. However, if the valve body repeatedly comes in contact with and moves away from the channel member, the substance contained in the liquid may accumulate on the channel member. The substance that has accumulated between the channel member and the valve body may prevent close contact between the channel member and the valve body, i.e., the through hole cannot be closed, and thus the performance of the valve may deteriorate.

SUMMARY

An advantage of some aspects of the invention is that the accumulation of the substance contained in the liquid on the valve is reduced.

First Aspect

A valve according to an aspect (first aspect) of the invention includes a seat having a through hole through which a liquid flows, and a valve body that is configured to be in contact with the seat to close the through hole such that the valve is in a closed state and to be separate from the seat to open the through hole such that the valve is in an open state. At least one of the seat and the valve body is configured to move relative to the other of the seat and the valve body while the valve is in the closed state. In the first aspect, since at least one of the valve body and the seat moves relative to the other while the valve is in the closed state in which the valve body and the seat are in contact with each other, the substance contained in the liquid that has accumulated on the valve body or the seat due to opening and closing operations of the valve is efficiently removed. Herein, the phrase "the state in which the valve body and the seat are in contact with each other" refers to a state in which the valve body and the seat are in direct contact with each other and a state in which accumulation is present between the valve body and the seat.

Second Aspect

In a preferable aspect (second aspect) of the first aspect, the closed state includes a first state in which the seat and the valve body are in contact with each other after at least one of the seat and the valve body of the valve in the open state moves relative to the other of the seat and the valve body in a first direction and a second state in which a contact surface of the valve body that is in contact with the seat is displaced in a direction intersecting the first direction with the contact between the seat and the valve body in the first state being maintained. In other words, a first state in which the valve body gets in contact with the seat caused by relative moving of at least one of the seat and the valve body in the open state in a first direction; and a second state in which a contact surface of the valve body that is in contact with the seat is rubbed against the seat in a direction intersecting the first direction. In the second aspect, since at least one of the valve body and the seat moves relative to the other in the first direction during the shifting from the open state to the first state of the closed state, and the contact surface of the valve body that is in contact with the seat moves in the direction intersecting the first direction during the second state, the accumulation on the valve body or the seat is readily removed.

Third Aspect

In a preferable aspect (third aspect) of the first aspect, the closed state includes a first state in which the seat and the valve body are in contact with each other after at least one of the seat and the valve body of the valve in the open state moves relative to the other of the seat and the valve body in a first direction and a second state in which a contact surface of the valve body that is in contact with the seat is displaced in the first direction with the contact between the seat and the valve body in the first state being maintained. In other words a first state in which the valve body gets in contact with the seat caused by relative moving of at least one of the seat and the valve body in the open state in a first direction; and a second state in which a contact surface of the valve body that is in contact with the seat is rubbed against the seat in the first direction. In the third aspect, at least one of the valve body and the seat moves relative to the other in the first direction during the shifting from the open state to the first state of the closed state, and the contact surface of the valve body that is in contact with the seat moves in the first direction during the second state. The direction of the relative movement between the valve body and the seat during the shifting from the open state to the first state is the same as that during the second state. This simplifies the configuration of the valve compared with that in the second aspect.

Fourth Aspect

In a preferable aspect (fourth aspect) of any one of the first to third aspects, at least one of the valve body and the seat includes an elastic contact portion that is in contact with the other of the valve body and the seat, and the elastic contact portion is elastically deformed during the second state. In the fourth aspect, since at least one of the valve body and the seat includes the elastic contact portion that is in contact with the other, the relative movement between the valve body and the seat is readily caused with the contact between the valve body and the seat being maintained.

Fifth Aspect

In a preferable aspect (fifth aspect) of the fourth aspect, the elastic contact portion is hollow. In the fifth aspect, since the elastic contact portion is hollow, the elastic contact portion is readily elastically deformed compared with a solid elastic contact portion. With this configuration, the through hole is readily closed by the contact between the valve body and the seat (sealing properties are improved).

Sixth Aspect

In a preferable aspect (sixth aspect) of the fourth or fifth aspect, at least one of the valve body and the seat includes a curved contact surface that is in contact with the other of the valve body and the seat. In the sixth aspect, since at least one of the valve body and the seat includes the curved contact surface, the stress acting between the valve body and the seat concentrates in a narrow area, and thus the through hole is readily closed (sealing properties are improved).

Seventh Aspect

In a preferable aspect (seventh aspect) of any one of the first to sixth aspects, the seat and the valve body are in contact with each other after at least one of the seat and the valve body of the valve in the open state moves relative to the other of the seat and the valve body in a first direction, and at least one of the valve body and the seat includes an inclined contact surface that is in contact with the other of the valve body and the seat and is inclined with respect to the first direction (i.e., diagonally intersects the first direction). In the seventh aspect, since at least one of the valve body and the seat includes the inclined contact surface inclined with respect to the first direction, the accumulation on the valve body or the seat is efficiently removed. In addition, due to the inclined contact surface, the through hole is efficiently closed even if deformation (creep, for example) of one of the valve body and the seat occurs.

Eighth Aspect

In a preferable aspect (eighth aspect) of the seventh aspect, one of the valve body and the seat includes the inclined contact surface, and the other of the valve body and the seat includes the curved contact surface. In the eighth aspect, since the inclined contact surface of one of the valve body and the seat is in contact with the curved contact surface of the other, a contact area between the valve body and the seat is reduced. With this configuration, the relative movement between the valve body and the seat is readily caused.

Ninth Aspect

A preferable aspect (ninth aspect) of the invention provides a pressure controlling apparatus that includes the valve according to any one of the first to eight aspects, a first channel that is located on one side of the through hole in the seat of the valve, a second channel that is located on another side of the through hole, and a movable portion configured to move the valve body by being displaced depending on pressure in the second channel. The valve body of the valve is positioned in the first channel. Since the accumulation due to the opening and closing operations of the valve is efficiently removed in the valve according to any one of the first to eighth aspects, the pressure controlling apparatus that efficiently controls the pressure in the second channel with high reliability is obtained.

Tenth Aspect

A preferable aspect (tenth aspect) of the invention provides a liquid ejecting apparatus that includes the pressure controlling apparatus according to the ninth aspect, a pressure regulator configured to increase a pressure in the first channel so as to be larger than a pressure in the second channel of the pressure controlling apparatus, and a liquid ejecting head configured to eject liquid supplied through the second channel. The pressure regulator increases the pressure in the first channel so as to be larger than the pressure in the second channel with the contact between the seat and the valve body that is moved by the displacement of the movable portion being in contact with each other, such that at least one of the seat and the valve body moves relative to the other with the contact between the seat and the valve body being maintained. In the tenth aspect, since the pressure in the first channel is increased by the pressure regulator so as to be larger than the pressure in the second channel such that the relative movement between the seat and the valve body is caused in the closed state in which the valve body and the seat are in contact with each other, the accumulation is reliably removed by the relative movement between the seat and the valve body. A preferable example of the liquid ejecting apparatus is a printer that ejects ink. However, the liquid ejecting apparatus of the invention is applicable to apparatuses other than the printer.

Eleventh Aspect

A preferable aspect (eleventh aspect) of the invention provides a method of opening and closing a valve including a valve body and a seat having a through hole. The method includes moving at least one of the seat and the valve body relative to the other of the seat and the valve body such that the valve is in one of an open state in which the seat and the valve body are separate from each other in order to open the through hole and allow a liquid to pass through the through hole and a closed state in which the seat and the valve body are in contact with each other in order to close the through hole and not allow the liquid to pass through the through hole, and moving at least one of the seat and the valve body relative to the other of the seat and the valve body while the valve is in the closed state. In the eleventh aspect, since the relative movement between the valve body and the seat is caused during the closed state in which the valve body and the seat are in contact with each other, the substance contained in the liquid, which has accumulated on the valve body or the seat due to the opening and closing operations of the valve, are efficiently removed.

Twelfth Aspect

In a preferable aspect (twelfth aspect) of the eleven aspect, the valve is disposed between a first channel located on one side of the through hole and a second channel located on another side of the through hole, and the valve body is moved relative to the seat by a movable portion displaced depending on the pressure in the second channel such that the valve is one of the open state and the closed state. The valve body is positioned in the first channel. In the method of opening and closing the valve in the twelfth aspect, the accumulation due to the opening and closing operations of the valve is efficiently removed, and thus the pressure in the second channel is efficiently controlled with high reliability.

Thirteenth Aspect

A preferable aspect (thirteenth aspect) of the twelfth aspect includes increasing the pressure in the first channel to be larger than the pressure in the second channel such that the valve body moves relative to the seat during the closed state. In the thirteenth aspect, since the pressure in the first channel is increased to be larger than the pressure in the second channel such that the relative movement between the seat and the valve body is caused during the closed state in which the valve body and the seat are in contact with each other, the accumulation is reliably removed by the relative movement between the seat and the valve body.

Fourteenth Aspect

In a preferable aspect (fourteenth aspect) of any one of the eleventh to thirteenth aspects, at least one of the valve body and the seat includes an elastic contact portion that is in contact with the other of the valve body and the seat, and the elastic contact portion is elastically deformed during the second state. In the fourteenth aspect, since at least one of the valve body and the seat includes the elastic contact portion that is in contact with the other, the relative movement between the valve body and the seat is readily caused with the contact between the valve body and the seat being maintained.

Fifteenth Aspect

In a preferable aspect (fifteenth aspect) of the fourteenth aspect, the elastic contact portion is hollow. In the fifteenth aspect, since the elastic contact portion is hollow, the elastic contact portion is readily elastically deformed compared with a solid elastic contact portion. With this configuration, the through hole is readily closed by the contact between the valve body and the seat (sealing properties are improved).

Sixteenth Aspect

In a preferable aspect (sixteenth aspect) of the fourteenth or fifteenth aspect, at least one of the valve body and the seat includes a curved contact surface that is in contact with the other of the valve body and the seat. In the sixteenth aspect, since the at least one of the valve body and the seat includes the curved contact surface, the stress acting between the valve body and the seat concentrates in a narrow area. Thus, the through hole is readily closed (sealing properties are improved).

Seventeenth Aspect

In a preferable aspect (seventeenth aspect) of any one of the eleventh to sixteenth aspects, the seat and the valve body are in contact with each other after at least one of the seat and the valve body of the valve in the open state moves relative to the other of the seat and the valve body in a first direction, and at least one of the valve body and the seat includes an inclined contact surface that is in contact with the other of the valve body and the seat and is inclined with respect to the first direction (i.e., diagonally intersects the first direction). In the seventeenth aspect, since the at least one of valve body and the seat includes the inclined contact surfaces inclined with respect to the first direction, the accumulation on the valve body or the seat is efficiently removed. In addition, since at least one of the valve body and the seat includes the inclined contact surface, the through hole is reliably closed even if deformation (creep, for example) of one of the valve body and the seat occurs.

Eighteenth Aspect

In a preferable aspect (eighteenth aspect) of the seventeenth aspect, one of the valve body and the seat includes the inclined contact surface and the other of the valve body and the seat includes the curved contact surface. In the eighteenth aspect, since the inclined contact surface of one of the valve body and the seat is in contact with the curved contact surface of the other of them, a contact area between the valve body and the seat is reduced. With this configuration, the relative movement between the valve body and the seat is readily caused.

BRIEF DESCRIPTION OF THE DRAWINGS

The invention will be described with reference to the accompanying drawings, wherein like numbers reference like elements.

FIGS. 3A, 3B, and 3C are views illustrating different states of the valve.

DESCRIPTION OF EXEMPLARY EMBODIMENTS

First Embodiment

Figure 1:
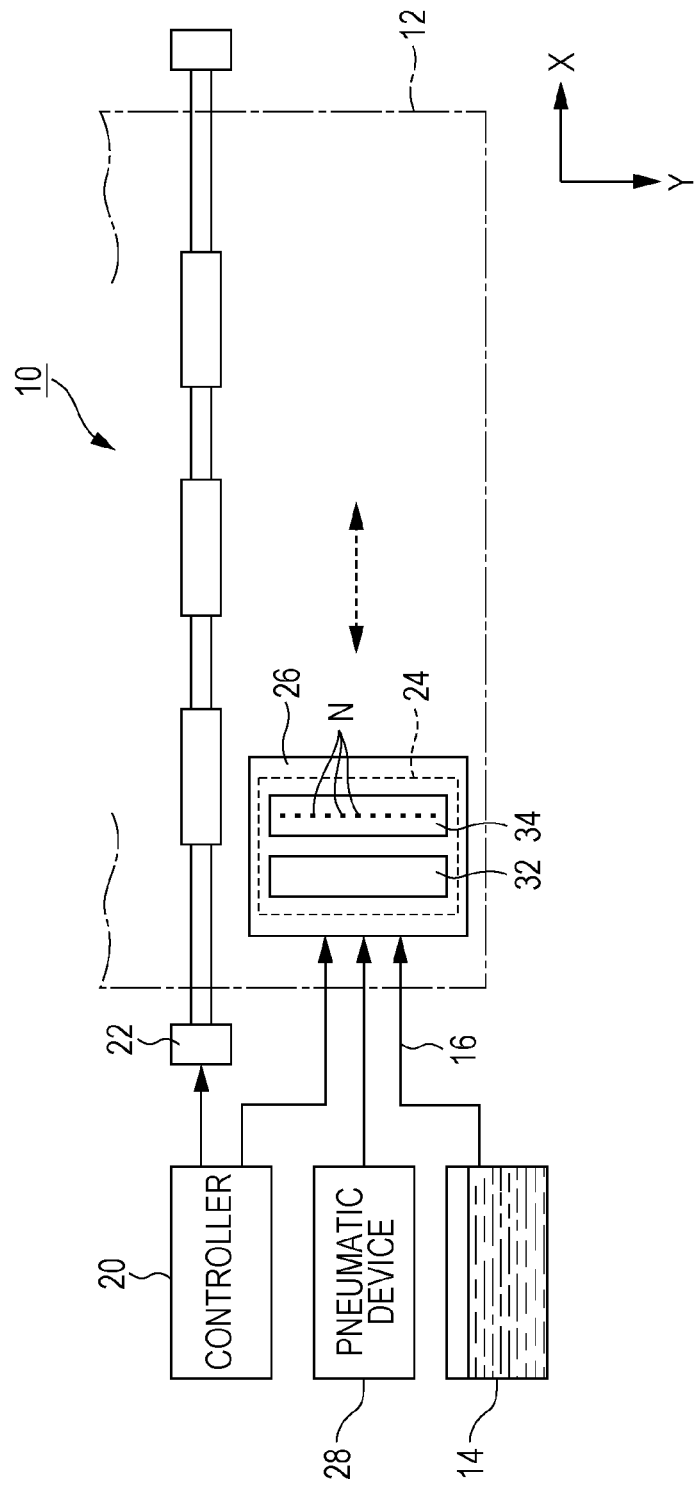
FIG. 1 is a configuration diagram of a printer of a first embodiment of the invention.

FIG. 1 is a partial configuration diagram of an ink jet printer 10 of a first embodiment of the invention. The printer 10 of the first embodiment is a liquid ejecting apparatus that ejects ink, which is an example of a liquid, to a medium such as a printing sheet (target) 12. As illustrated in FIG. 1, the printer 10 includes a controller 20, a transporting mechanism 22, a liquid ejecting unit 24, a carriage 26, and a pneumatic device 28. A liquid reservoir (cartridge) 14 that stores the ink is mounted on the printer 10. The ink is supplied from the liquid reservoir 14 to the liquid ejecting unit 24 through a liquid supplying tube 16. The ink used in the first embodiment is a pigment ink including a pigment, for example.

The controller 20 controls each component of the printer 10. The transporting mechanism 22 transports a medium 12 in a Y direction under control of the controller 20. The pneumatic device 28 (typically, a pump) applies pressure to the ink supplied from the liquid reservoir 14 to the liquid ejecting unit 24 through the liquid supplying tube 16.

As illustrated in FIG. 1, the liquid ejecting unit 24 includes a pressure controlling apparatus 32 and a liquid ejecting head 34. The liquid ejecting head 34 ejects the ink through a plurality of nozzles N to the medium 12 under the control of the controller 20. The liquid ejecting head 34 of the first embodiment includes multiple sets of pressure chambers and piezoelectric elements (not illustrated) each provided for a different one of the nozzles. The piezoelectric element is vibrated by application of a driving signal to vary the pressure in the pressure chamber, which allows the ink in the pressure chamber to be ejected through the nozzle N. The pressure controlling apparatus 32 illustrated in FIG. 1 includes a channel through which the ink, which has been supplied from the liquid reservoir 14 to the liquid ejecting unit 24 through the liquid supplying tube 16, flows to the liquid ejecting head 34.

The liquid ejecting unit 24 is mounted on the carriage 26. The controller 20 reciprocates the carriage 26 in an X direction that intersects the Y direction. The liquid ejecting head 34 ejects the ink to the medium 12 transported by the transporting mechanism 22 while the carriage 26 is repeatedly reciprocated. As a result, a predetermined image is formed on the medium 12. A plurality of liquid ejecting units 24 that eject different kinds of ink may be mounted on the carriage 26.

Figure 2:
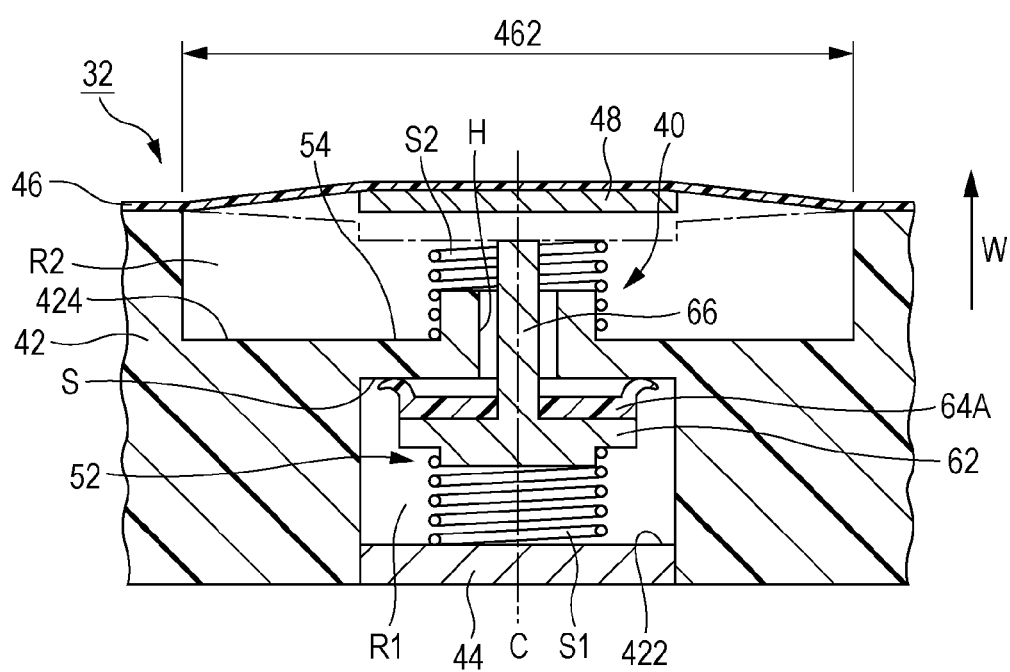
FIG. 2 is a view of a valve mounted in a pressure controlling apparatus.

The pressure controlling apparatus 32 of the first embodiment includes a valve 40, which is illustrated in FIG. 2, in a channel extending between the liquid supplying tube 16 and the liquid ejecting head 34. The valve 40 of the first embodiment is a valve mechanism disposed between a first channel R1, which is adjacent to the liquid reservoir 14, and a second channel R2, which is adjacent to the liquid ejecting head 34. The valve 40 opens and closes the first channel R1 depending on the pressure (negative pressure) in the second channel R2. Specifically, in a normal state in which the pressure in the second channel R2 is within a predetermined range, the valve 40 shuts off the first channel R1 from the second channel R2. If the pressure in the second channel R2 is reduced due to ejection of the ink from the liquid ejecting head 34 or suction from an external component, for example, the valve 40 enables the first channel R1 and the second channel R2 to be in communication with each other. The first channel R1 and the second channel R2 that are in communication with each other allow the ink, which has been supplied to the first channel R1 from the liquid reservoir 14 through the liquid supplying tube 16, to flow to the second channel R2 through the valve 40 and to the liquid ejecting head 34. Specifically, the first channel R1 and the second channel R2 are positioned upstream and downstream, respectively, of the valve 40. A filter that collects bubbles and foreign substances contained in the ink may be disposed upstream of the first channel R1 and/or downstream of the second channel R2, for example.

As illustrated in FIG. 2, the pressure controlling apparatus 32 of the first embodiment includes a supporting member 42, a sealing member 44, and a sealing member 46. The sealing member 44 is fixed on a surface of the supporting member 42 having a substantially flat shape. The sealing member 46 is fixed on another surface of the supporting member 42. The supporting member 42 may be produced by injection molding a resin material such as polypropylene (PP). The supporting member 42 has a recess 422 having a substantially circular shape in plan view and having an opening adjacent to the sealing member 44 and a recess 424 having a substantially circular shape in plan view and having an opening adjacent to the sealing member 46. A space defined by the recess 422 and the sealing member 44 is the first channel R1. A space defined by the recess 424 and the sealing member 46 is the second channel R2. The first channel R1 and the second channel R2 are in communication with the liquid supplying tube 16 (or the liquid reservoir 14) and the liquid ejecting head 34, respectively, directly or indirectly through another component.

The sealing member 46 is a thin plate (film) formed of a resin material such as polypropylene, which is the same material as the supporting member 42, for example, and is welded or bonded to the surface of the supporting member 42. A pressure receiving plate 48 is disposed on a portion of the sealing member 46 (hereinafter, referred to as a movable portion 462) that extends over the recess 424 in plan view so as to face the supporting member 42. The pressure receiving plate 48 is a plate having a substantially circular shape, for example. However, the pressure receiving plate 48 is an optional component.

As illustrated in FIG. 2, the valve 40 of the first embodiment includes a valve body 52, a seat 54, a spring S1, and a spring S2. In general, the first channel R1 is closed or opened (the first and second channels R1 and R2 are shut off from or in communication with each other) by moving the valve body 52 toward the positive or negative W direction side of the seat 54.

The seat 54 is a portion of the supporting member 42 that is positioned between the first channel R1 and the second channel R2 (i.e., a portion providing bottom portions of the recess 422 and the recess 424). The seat 54 faces the movable portion 462 of the sealing member 46 with a space therebetween. The seat 54 is a partition wall that separates the first channel R1 from the second channel R2. As illustrated in FIG. 2, the seat 54 has a through hole H extending through the supporting member 42 at a substantial center thereof. The through hole H in the first embodiment has a true circular shape in plan view and has an inner surface extending in the W direction. The first channel R1 and the second channel R2 that are positioned upstream and downstream, respectively, of the seat 54 are in communication with each other through the through hole H in the seat 54.

The valve body 52 of the valve 40 is disposed in the first channel R1. As illustrated in FIG. 2, the valve body 52 in the first embodiment includes a base 62, a sealing portion 64A, and a valve shaft 66. The base 62 is a flat plate that has a circular shape having an outer diameter larger than a diameter of the through hole H. The valve shaft 66 is coaxial with the base 62 and extends in a vertical direction from a surface of the base 62. The sealing portion 64A having a ring shape is disposed on the base 62 of the sealing portion 64A so as to surround the valve shaft 66 in plan view. The valve body 52 is set such that the base 62 and the sealing portion 64A are positioned in the first channel R1 with the valve shaft 66 having an axis C extending in the W direction being positioned in the through hole H in the seat 54. In other words, the base 62 and the sealing portion 64A of the valve body 52 are positioned on an opposite side of the seat 54 from the movable portion 462 (or the second channel R2). The valve shaft 66 in the through hole H extending through the seat 54 has a tip facing the pressure receiving plate 48, which is on the movable portion 462, in the second channel R2. The valve shaft 66 has a diameter smaller than that of the through hole H. As illustrated in FIG. 2, there is a gap between an inner surface of the through hole H in the seat 54 and an outer surface of the valve shaft 66. The spring S1 illustrated in FIG. 2 is disposed between the sealing member 44 and the base 62 of the valve body 52 such that the valve body 52 is biased toward the seat 54. The spring S2 is disposed between the seat 54 and the pressure receiving plate 48 (or the movable portion 462).

As illustrated in FIG. 2, the sealing portion 64A of the valve body 52 is positioned between the base 62 and the seat 54 and is configured to function as a seal for closing the through hole H when in contact with the seat 54. Specifically, the sealing portion 64A of the first embodiment comes in contact with a surface S (hereinafter, referred to as a "sealing surface") of the seat 54 that faces the first channel R1.

FIGS. 3A to 3C are magnified cross-sectional views of an area including the valve body 52 in FIG. 2. As illustrated in FIGS. 3A to 3C, the sealing portion 64A of the first embodiment is an elastic member integrally including a bottom portion 722 and an outer portion 724 that are formed of an elastic material (elastomer). The bottom portion 722 has a ring shape. The outer portion 724 has a ring shape and extends along an outer periphery of the bottom portion 722. The outer portion 724 of the first embodiment protrudes from a surface of the bottom portion 722 toward the positive W direction side of the seat 54 and extends outwardly (toward a side away from the axis C in a direction perpendicular to the W direction) from the outer periphery of the bottom portion 722. The sealing surface S of the seat 54 is a flat surface. The surface of the outer portion 724 of the sealing portion 64A that faces the sealing surface S is a curved surface.

In the above-described configuration, in a normal state in which the pressure in the second channel R2 is in a predetermined range, the outer portion 724 of the sealing portion 64A is in contact with the sealing surface S of the seat 54 since the valve body 52 is biased by the spring S1. In such a state, the through hole H in the seat 54 is closed by the valve body 52 as illustrated in FIG. 2 and FIG. 3B (this state is referred to as a "closed state" hereinafter). In other words, the first channel R1 and the second channel R2 are shut off from each other. If the pressure in the second channel R2 is reduced due to the ejection of the ink by the liquid ejecting head 34 or suction by an external component, for example, the movable portion 462 of the sealing member 46 is displaced toward the seat 54 as indicated by a chain line in FIG. 2, and the pressure receiving plate 48 on the movable portion 462 compresses the valve shaft 66 of the valve body 52 against the biasing force of the spring S2. The movable portion 462 functions as a diaphragm that is displaced depending on the pressure (negative pressure) in the second channel R2. If the pressure in the second channel R2 is further reduced, the movable portion 462 (the pressure receiving plate 48) compresses the valve shaft 66, and the valve body 52 is moved in the W direction toward the negative W direction side of the seat 54 (toward the sealing member 44) against the biasing force of the spring S1. In such a state, the sealing portion 64A is separate from the seat 54 as illustrated in FIG. 3A (this state is referred to as an "open state" hereinafter). In the open state, the through hole H in the seat 54 is open, and the first channel R1 and the second channel R2 are in communication with each other through the through hole H.

In the open state, the ink supplied to the first channel R1 from the liquid reservoir 14 through the liquid supplying tube 16 flows to the second channel R2 through the through hole H. The pressure in the second channel R2 becomes less negative due to the ink supply through the first channel R1, and thus the valve body 52 moves toward the positive W direction side of the seat 54 (toward the movable portion 462) by the biasing force of the spring S1. Thus, the state of the valve 40 shifts to the closed state again in which the outer portion 724 of the sealing portion 64A is in contact with the sealing surface S of the seat 54. In other words, the first channel R1 and the second channel R2 are shut off from each other, and the ink is not supplied from the first channel R1 to the second channel R2. As can be understood from this, the valve body 52 of the first embodiment moves depending on the pressure in the second channel R2 such that the valve 40 is in the open state and the closed state. The through hole H is opened and closed by the valve body 52 moved toward the positive and negative W direction sides of the seat 54. If the valve body 52 repeatedly comes in contact with and moves away from the sealing surface S, the ink component (pigment, for example) may accumulate on a portion of the sealing surface S that comes in contact with the valve body 52.

The closed state of the valve 40 includes a first state and a second state. As described above, in the first state, the valve body 52 is in contact with the sealing surface S of the seat 54 after the valve body 52 of the valve 40 in the open state moves toward the positive W direction side of the seat 54 due to the ink supply to the second channel R2. While the valve 40 is in the first state in which the valve body 52 and the seat 54 are in contact with each other, the pneumatic device 28 increases the pressure in the first channel R1. This allows the valve 40 to be in the second state in which the valve body 52 moves relative to the seat 54 with the contact between the valve body 52 and the seat 54 being maintained as illustrated in FIG. 3C. The second state is a state for removing the substance (ink component such as pigment) accumulated due to the repeated opening and closing operations of the valve 40.

Figure 4:
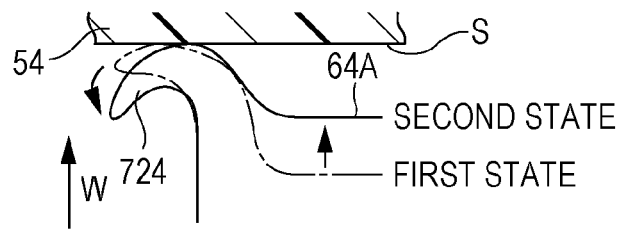
FIG. 4 is a view illustrating how a sealing portion is deformed during a second state.

FIG. 4 is a magnified cross-sectional view of the outer portion 724 of the sealing portion 64A in the second state. In FIG. 4, an outline of the sealing portion 64A in the first state is indicated by a chain line. As illustrated in FIG. 4, in the second state, the valve body 52 moves relative to the seat 54 toward the positive W direction side of the seat 54 such that the sealing portion 64A of the valve body 52 is pressed against the sealing surface S and deformed in a shape different from that in the first state. Specifically, as illustrated in FIG. 4, a contact surface of the outer portion 724 of the sealing portion 64A that is in contact with the sealing surface S of the seat 54 moves in the direction intersecting the W direction (specifically, a radial direction centered at the axis C), and the outer portion 724 is deformed such that a tip thereof is positioned away from the sealing surface S compared with that in the first state. As described above, in the second state of the first embodiment, the outer portion 724 of the sealing portion 64A removes (scrapes out) the accumulation on the sealing surface S when the valve body 52 moves relative to the seat 54 with the contact between the sealing portion 64A of the valve body 52 and the sealing surface S of the seat 54 being maintained.

As described above, in the first embodiment, the valve body 52 moves relative to the seat 54 while the valve 40 is in the closed state in which the valve body 52 and the seat 54 are in contact with each other. With this configuration, the accumulation on the sealing surface S due to the opening and closing operations of the valve 40 is efficiently removed compared with a case in which the valve body 52 moves only such that the valve 40 is in the first state and the open state. Since the accumulation on the sealing surface S is efficiently removed as described above, the first embodiment provides the pressure controlling apparatus 32 that reliably controls the pressure in the second channel R2.

Furthermore, in the first embodiment, since the sealing portion 64A of the valve body 52 is formed of the elastic material, the valve body 52 readily moves relative to the seat 54 with the contact between the valve body 52 and the seat 54 being maintained during the closed state. In the above-described embodiment, since the contact surface of the valve body 52 that is in contact with the seat 54 (the surface of the outer portion 724 of the sealing portion 64A) is the curved surface, the stress applied by the valve body 52 become concentrated in a narrow area of the sealing surface S. Thus, the through hole H is readily closed by the contact between the valve body 52 and the seat 54 (sealing properties are improved). In addition, the accumulation on the sealing surface S is efficiently removed.

Second Embodiment

A second embodiment of the invention is described. Components of embodiments described below that are the same as those of the first embodiment in operation and function are assigned the same reference numerals as those in the first embodiment, and a detailed description thereof is omitted.

Figure 5:
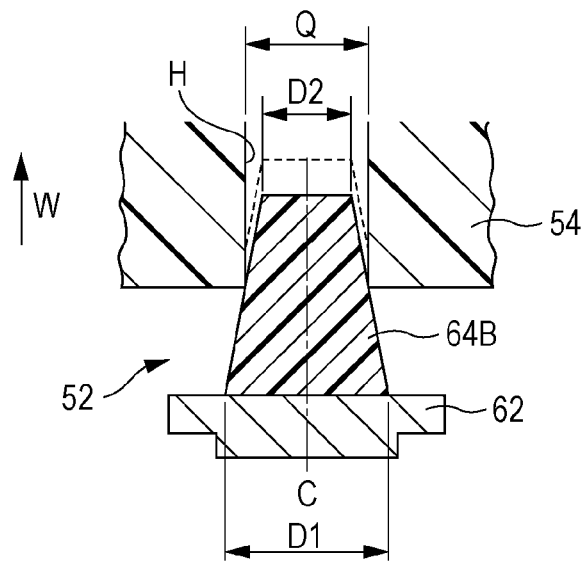
FIG. 5 is a view of a valve of a second embodiment.

FIG. 5 is a view of the valve 40 in the second embodiment of the invention. The valve body 52 of the second embodiment includes a sealing portion 64B illustrated in FIG. 5 instead of the sealing portion 64A of the first embodiment. As illustrated in FIG. 5, the sealing portion 64B of the second embodiment is an elastic member having a truncated conical shape in which a diameter thereof in a cross section gradually changes in the W direction such that a diameter D2 at an end adjacent to the second channel R2 (or the movable portion 462) is smaller than a diameter D1 at an end adjacent to the first channel R1 (or the base 62). As in the first embodiment, the through hole H in the seat 54 has a true circular shape that has a constant diameter Q over the entire length in the W direction. The diameter D2 (smallest diameter) of the sealing portion 64B at the end adjacent to the second channel R2 is smaller than the diameter Q of the through hole H. The diameter D1 (largest diameter) of the sealing portion 64B at the end adjacent to the first channel R1 is larger than the diameter Q of the through hole H (D2<Q<D1). The valve body 52 is disposed in the first channel R1 with a front end of the sealing portion 64B being positioned in the through hole H.

As illustrated in FIG. 5, when the valve body 52 of the valve 40 in the open state, in which the valve body 52 and the seat 54 are separate from each other, moves toward the positive W direction side of the seat 54, the state of the valve 40 shifts from the open state to the first state of the closed state in which an outer surface of the sealing portion 64B is in contact with an inner periphery of the through hole H in the seat 54. The contact surface of the valve body 52 (the outer periphery of the sealing portion 64B) that is in contact with the seat 54 in the closed state includes an inclined surface (tapered surface) inclined with respect to the W direction.

When the pneumatic device 28 increases the pressure in the first channel R1 while the valve 40 is in the first state, the state shifts from the first state to the second state as indicated by a broken line in FIG. 5. In the second state, the sealing portion 64B is elastically deformed to allow the valve body 52 to move toward the positive W direction side of the seat 54 with the contact between the sealing portion 64B and the seat 54 in the first state being maintained. In other words, the contact surface of the valve body 52 that is in contact with the seat 54 moves in the W direction in the second state. In the second state, the ink component that has accumulated on a portion of the seat 54 around the inner periphery of the through hole H (the sealing surface S of the seat 54 and the inner surface of the through hole, for example) is pushed away and removed by the sealing portion 64B.

As described above, since the valve body 52 further moves relative to the seat 54 while the valve 40 is in the closed state, in which the valve body 52 and the seat 54 are in contact with each other, the second embodiment has the same advantage as that in the first embodiment. In addition, since the contact surface of the valve body 52 that is in contact with the seat 54 is the inclined surface inclined with respect to the W direction in the second embodiment, the valve body 52 is capable of closing the through hole H even if creep occurs on the sealing portion 64B, for example.

In the second state, the contact surface of the valve body 52 that is in contact with the seat 54 moves in the W direction, which is the same movement direction as the valve body 52 in the first state. This simplifies the configuration of the valve 40 compared with that in the first embodiment in which the contact surface of the valve body 52 that is in contact with the seat 54 moves in the direction perpendicular to the W direction during the second state. However, in the second state of the first embodiment, since the contact surface of the valve body 52 that is in contact with the seat 54 moves in the direction intersecting the W direction, which is the moving direction of the valve body 52 in the first state, the accumulation on the seat 54 is readily removed compared with the second state of the second embodiment in which the contact surface moves in the W direction.

Third Embodiment

Figure 6:
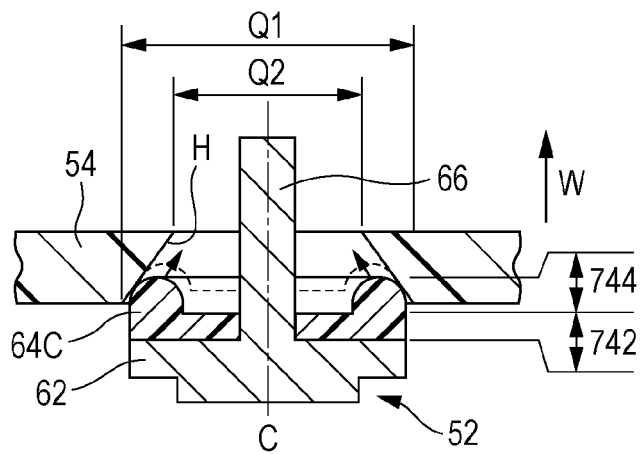
FIG. 6 is a view of a valve of a third embodiment.

FIG. 6 is a view of the valve 40 of a third embodiment. The valve body 52 of the third embodiment includes a sealing portion 64C illustrated in FIG. 6 instead of the sealing portion 64A of the first embodiment. As illustrated in FIG. 6, the sealing portion 64C of the third embodiment is an elastic member integrally including a bottom portion 742 and a contact portion 744. The bottom portion 742 has a ring shape. The contact portion 744 has a ring shape and extends along an outer edge of the bottom portion 742. The contact portion 744 has a curved front surface (specifically, an arc-like front surface) that protrudes from the surface of the bottom portion 742 toward the positive W direction side of the seat 54. The through hole H in the seat 54 of the third embodiment is a tapered hole in which a diameter thereof gradually changes in the W direction such that the diameter Q1 at an end adjacent to the first channel R1 is larger than the diameter Q2 at an end adjacent to the second channel R2.

As illustrated in FIG. 6, when the valve body 52 of the valve 40 in the open state, in which the valve body 52 and the seat 54 are separate from each other, moves toward the positive W direction side of the seat 54, the state of the valve 40 shifts to the first state of the closed state in which the contact portion 744 of the sealing portion 64C is in contact with the inner surface of the through hole H in the seat 54. The contact surface of the valve body 52 that is in contact with the seat 54 while the valve 40 is in the closed state is the curved surface (specifically, the arc-like surface), and the contact surface of the seat 54 that is in contact with the valve body 52 while the valve 40 is in the closed state is the inclined surface inclined with respect to the W direction. As described above, in the third embodiment, the inner surface of the through hole H in the seat 54 functions as a sealing surface that is in contact with the valve body 52.

When the pneumatic device 28 increases the pressure in the first channel R1 while the valve 40 is in the first state, the state shifts from the first state to the second state. In the second state, the sealing portion 64C is elastically deformed with the contact between the sealing portion 64C and the seat 54 in the first state being maintained such that the valve body 52 moves toward the positive W direction side of the seat 54 as indicated by a broken line in FIG. 6. In the second state, the contact surface of the sealing portion 64C that is in contact with the seat 54 moves along the inner surface of the through hole H (i.e., in a direction inclined with respect to the W direction). Thus, in the second state, the ink component that has accumulated on the inner surface of the through hole H in the seat 54 is pushed away and removed by the sealing portion 64C.

In the third embodiment, the same advantages as those in the first embodiment are obtained. In the third embodiment, the contact surface (the inner surface of the through hole H) of the seat 54 that is in contact with the valve body 52 is the inclined surface that is inclined with respect to the W direction, and the contact surface of the valve body 52 that is in contact with the seat 54 is the curved surface. This configuration reduces a contact area between the valve body 52 and the seat 54 compared with a case in which the valve body 52 has the inclined contact surface, which is in contact with the seat 54, corresponding to the inner surface of the through hole H, for example. Thus, the valve body 52 readily moves relative to the seat 54.

Figure 7:
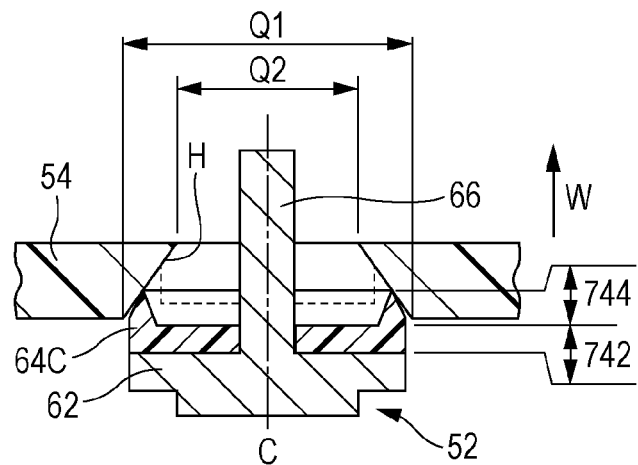
FIG. 7 is a view of a valve of a modified third embodiment.

In FIG. 6, although the contact portion 744 of the sealing portion 64C of the valve body 52 has the arc-like surface, the shape of the contact portion 744 may be a (triangular) prism in which two inclined surfaces extending along the outer edge of the bottom portion 742 intersect each other as illustrated in FIG. 7. As indicated by a broken line in FIG. 7, the configuration illustrated in FIG. 7 allows the contact surface of the sealing portion 64C that is in contact with the valve body 52 to move along the inner surface of the through hole H during the second state.

Fourth Embodiment

Figure 8:
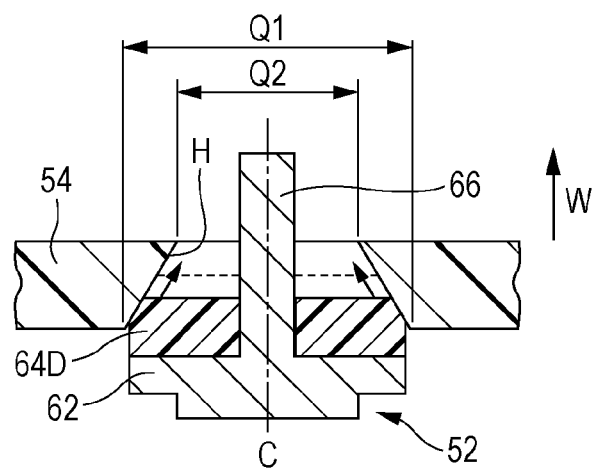
FIG. 8 is a view of a valve of a fourth embodiment.

FIG. 8 is a view of the valve 40 of a fourth embodiment. The valve body 52 of the fourth embodiment includes a sealing portion 64D illustrated in FIG. 8 instead of the sealing portion 64A of the first embodiment. The sealing portion 64D of the fourth embodiment is an elastic member having a ring shape in plan view as indicated in FIG. 8. Specifically, the sealing portion 64D has an inclined surface (tapered surface) such that an outer diameter thereof in a cross section gradually changes in the W direction such that a diameter at an end adjacent to the second channel R2 is smaller than a diameter at an end adjacent to the first channel R1. As in the third embodiment, the through hole H in the seat 54 is a tapered hole in which a diameter thereof gradually changes in the W direction such that the diameter Q1 at an end adjacent to the first channel R1 is larger than the diameter Q2 at an end adjacent to the second channel R2. The outer surface of the sealing portion 64D and the inner surface of the through hole H are inclined at substantially the same angle.

As illustrated in FIG. 8, when the valve body 52 of the valve 40 in the open state, in which the valve body 52 is separate from the seat 54 moves toward the positive W direction side of the seat 54, the state shifts to the first state of the closed state in which the outer surface of the sealing portion 64D is in contact with the inner surface of the through hole H in the seat 54. In the fourth embodiment, each of the contact surfaces of the valve body 52 and the seat 54 that is in contact with the other during the closed state is the inclined surface inclined with respect to the W direction. As in the third embodiment, the inner surface of the through hole H in the seat 54 functions as the sealing surface that is in contact with the valve body 52.

When the pneumatic device 28 increases the pressure in the first channel R1 while the valve 40 is in the first state, the state shifts to the second state as indicated by a broken line in FIG. 8. In the second state, the sealing portion 64D is elastically deformed and the valve body 52 moves toward the positive W direction side of the seat 54 with the contact between the sealing portion 64D and the seat 54 being maintained. As in the third embodiment, the contact surface of the sealing portion 64D that is in contact with the valve body 52 moves along the inner surface of the through hole H (in the direction inclined with respect to the W direction) during the second state. Thus, in the second state, the ink component that has accumulated on the inner surface of the through hole H in the seat 54 is pushed away and removed by the sealing portion 64D. In the fourth embodiment, the same advantages as those in the first embodiment are obtained.

Fifth Embodiment

Figure 9:
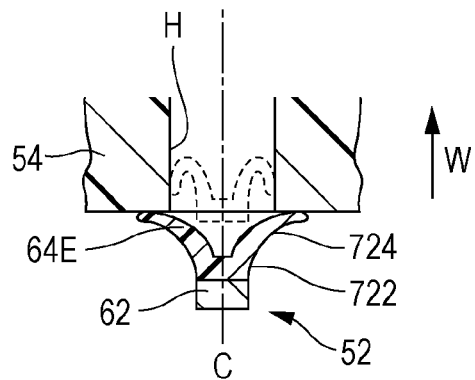
FIG. 9 is a view of a valve of a fifth embodiment.

FIG. 9 is a view of the valve 40 of a fifth embodiment. The valve body 52 of the fifth embodiment includes a sealing portion 64E illustrated in FIG. 9 instead of the sealing portion 64A of the first embodiment. As illustrated in FIG. 9, the sealing portion 64E of the fifth embodiment is an elastic member integrally including a bottom portion 722 and an outer portion 724 as the sealing portion 64A of the first embodiment. The through hole H in the seat 54 of the fifth embodiment has a true circular shape that has a constant diameter over the entire length in the W direction.

As illustrated in FIG. 9, when the valve body 52 in the open state, in which the valve body 52 is separate from the seat 54, moves toward the positive W direction side of the seat 54, the state shifts to the first state of the closed state in which the outer portion 724 of the sealing portion 64E is in contact with the inner periphery of the through hole H in the seat 54. When the pneumatic device 28 increases the pressure in the first channel R1 while the valve 40 is in the first state, the state shifts to the second state. In the second state, the valve body 52 moves toward the positive W direction side of the seat 54 as indicated by a broken line in FIG. 9 with the contact between the tip of the outer portion 724 of the sealing portion 64E and the inner surface of the through hole H being maintained. In the second state, the contact surface of the valve body 52 that is in contact with the seat 54 moves or slides in the W direction. Thus, in the second state, the ink component that has accumulated on the inner surface of the through hole H in the seat 54 is removed by the sliding movement of the sealing portion 64E.

Sixth Embodiment

Figure 10:
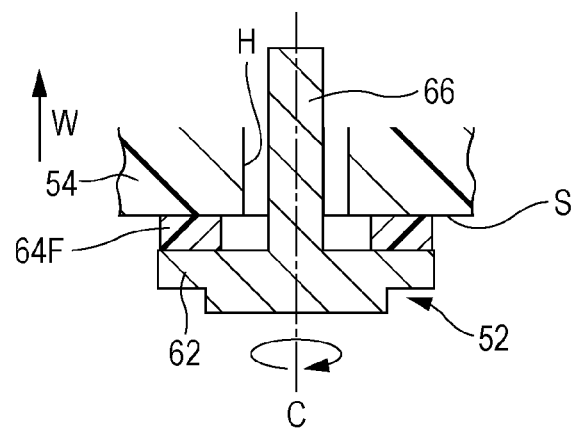
FIG. 10 is a view of a valve of a sixth embodiment.

FIG. 10 is a view of the valve 40 of a sixth embodiment. The valve body 52 of the sixth embodiment includes a sealing portion 64F illustrated in FIG. 10 instead of the sealing portion 64A of the first embodiment. As illustrated in FIG. 10, the sealing portion 64F of the sixth embodiment is an elastic member having a ring shape. The through hole H in the seat 54 of the sixth embodiment has a true circular shape that has a constant diameter over the entire length in the W direction.

As illustrated in FIG. 10, when the valve body 52 of the valve 40 in the open state, in which the valve body 52 and the seat 54 are separate from each other, moves toward the positive W direction side of the seat 54, the state shifts to the first state of the closed state in which the surface of the sealing portion 64F is in contact with the sealing surface S of the seat 54 adjacent to the first channel R1. When the pneumatic device 28 increases the pressure in the first channel R1 while the valve 40 is in the first state, the state shifts to the second state in which the valve body 52 moves toward the positive W direction side of the seat 54 while rotating around the axis C. Any structure such as a structure described in JP-A-2013-132895 may be employed to rotate the valve body 52. As can be understood from the above, the contact surface of the valve body 52 that is in contact with the seat 54 moves in the direction intersecting the W direction (circumferential direction centered at the axis C). Thus, the ink component that has accumulated on the sealing surface S of the seat 54 around the inner periphery of the through hole H is removed by the sliding movement of the sealing portion 64F. In the sixth embodiment, the same advantages as those in the first embodiment are obtained.

Modifications

The above-described embodiments may be modified in various ways. Specific features of modifications are described below. Any two or more of the features may be combined unless the combination causes any inconsistency.

Figure 11:
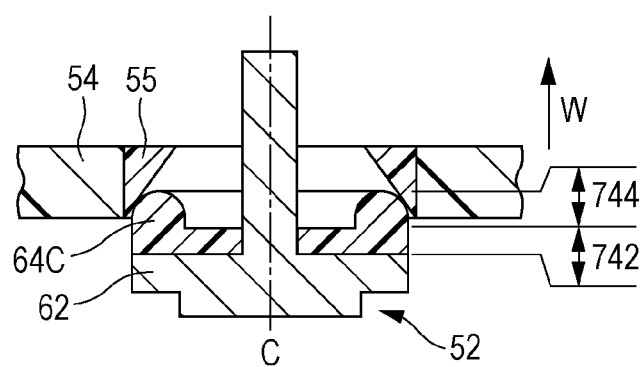
FIG. 11 is a view of a valve of a modified example.

(1) In the above-described embodiments, the sealing portion 64 (64A, 64B, 64C, 64D, 64E, and 64F) of the valve body 52 that is in contact with the seat 54 is the elastic member. However, instead of the sealing portion 64 (or additionally to the sealing portion 64), a portion of the seat 54 that is in contact with the valve body 52 may be an elastic member. As illustrated in FIG. 11, a portion of the seat 54 including the inner surface of the through hole H (i.e., a portion to be in contact with the valve body 52) may be an elastic member 55, for example. Although the configuration in FIG. 11 is based on the third embodiment, the same modification may be applied to any one of the embodiments. In addition, in FIG. 11, although a portion of the seat 54 is the elastic member, the entire of the seat 54 may be the elastic member.

Figure 12:
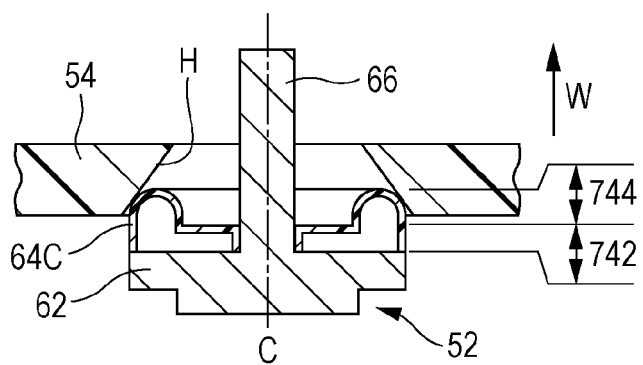
FIG. 12 is a view of a valve of a modified example.
Figure 13:
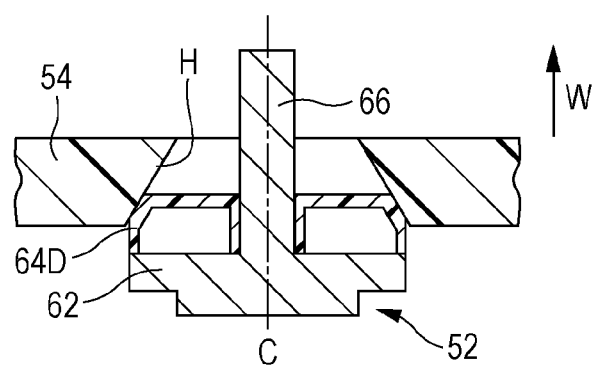
FIG. 13 is a view of a valve of a modified example.

(2) In the above-described embodiments, the sealing portion 64 of the valve body 52 is the solid elastic member. However, the sealing portion 64 may be a hollow elastic member. Specifically, as illustrated in FIG. 12, the sealing portion 64C in the third embodiment may be modified to be hollow, or as illustrated in FIG. 13, the sealing portion 64D in the fourth embodiment may be modified to be hollow. If the entire or a part of the seat 54 is the elastic member as illustrated in FIG. 11, the elastic member may be modified to be hollow. In the above-described configuration in which at least one of the valve body 52 and the seat 54 includes the hollow elastic contact portion that is in contact with the other, the valve body 52 and/or the seat 54 is readily elastically deformed in the second state. Thus, the through hole H is readily closed by the contact between the valve body 52 and the seat 54 (sealing properties are improved).

(3) In the above embodiments, the pneumatic device 28 applies pressure to the first channel R1 to shift the state of the valve 40 from the first state to the second state. However, any other configuration may be employed to shift the state of the valve 40 from the first state to the second state. A closed space may be provided on an opposite side of the movable portion 462 of any one of the embodiments from the second channel R2. The pressure in the closed space is reduced (to be lower than the atmospheric pressure in the normal state), and the valve body 52 is moved toward the positive W direction side of the seat 54 to reduce the pressure in the second channel R2 to be negative such that the state of the valve 40 shifts from the first state to the second state. As can be understood from the above, the pneumatic device 28 in the embodiments is an example of a pressure regulator that regulates the pressure in the first channel R1 relative to that in the second channel R2. In the invention, the pressure in the first channel R1 may be increased or the pressure in the second channel R2 may be reduced to shift the state from the first state to the second state.

The state of the valve 40 may shift from the first state to the second state without the pressure regulator such as the pneumatic device 28. The state of the valve 40 may shift from the first state to the second state when the pressure in the second channel R2 is further reduced by the ejection of the ink by the liquid ejecting head 34 or the suction by an external component. As can be understood from the above, the pneumatic device 28 for shifting the state of the valve 40 from the first state to the second state is an optional component. However, the configuration of the embodiments that includes the pneumatic device 28 to actively apply the pressure in the first channel R1 reliably removes the accumulation on the valve body 52 or the seat 54 by the shifting of the state from the first state to the second state.

(4) In the above-described embodiments, the movable portion 462 has the thin plate (film) like shape. However, the movable portion 462 may have any configuration. The movable portion 462 may be formed of an elastic material to be elastically deformed depending on the pressure in the second channel R2, or may have an expandable structure such as a bellows structure to be deformed depending on the pressure in the second channel R2. The flexibility of the movable portion is optional feature to the invention.

(5) In the above-described embodiments, the valve body 52 moves relative to the seat 54. However, the seat 54 may move relative to the valve body 52. As can be understood from this, as long as the relative movement between the seat 54 and the valve body 52 is caused during the closed state, any one of the valve body 52 and the seat 54 may move in the invention.

(6) In the above-described embodiments, a serial head in which the carriage 26 having the liquid ejecting unit 24 thereon repeatedly reciprocates in the X direction is described as an example. However, the invention is applicable to a line head including a plurality of nozzles N arranged in the X direction over the entire width of the medium 12. In addition, a driving element that allows the ink to be ejected through the nozzles N of the liquid ejecting head 34 is not limited to the piezoelectric element in the embodiments. The driving element may be a heating element (heater) that generates a bubble by heating to vary pressure in a pressure chamber such that the ink is ejected through the nozzles N.

(7) The printer 10 described in the embodiments may be used in a print-only printer, or any apparatus such as a facsimile machine and a copier. However, the application of the liquid ejecting apparatus of the invention is not limited to the printer. The liquid ejecting apparatus that ejects a colored solution may be used as an apparatus for producing a colored filter of a liquid display, for example. The liquid ejecting apparatus that ejects a solution of a conductive material may be used as an apparatus for forming a wire or an electrode of a wiring substrate.

What is claimed is:

1. A valve comprising:
    a seat having a through hole through which a liquid flows; and
    a valve body that is configured to be in contact with the seat to close the through hole such that the valve is in a closed state and to be separate from the seat to open the through hole such that the valve is in an open state, wherein
    at least one of the seat and the valve body is configured to move relative to the other of the seat and the valve body while the valve is in the closed state,
    wherein the closed state includes: a first state in which the valve body gets in contact with the seat caused by relative moving of at least one of the seat and the valve body in the open state in a first direction; and a second state in which a contact surface of the valve body that is in contact with the seat is rubbed against the seat in a direction intersecting the first direction.

2. The valve according to claim 1, wherein the closed state further includes a state in which a contact surface of the valve body that is in contact with the seat is rubbed against the seat in the first direction.

3. A pressure controlling apparatus comprising:
the valve according to claim 2;
a first channel that is located on one side of the through hole in the seat of the valve and in which the valve body of the valve is disposed;
a second channel that is located on another side of the through hole; and
a movable portion configured to move the valve body by being displaced depending on pressure in the second channel.

4. The valve according to claim 1, wherein at least one of the valve body and the seat includes an elastic contact portion that is in contact with the other of the valve body and the seat, and the elastic contact portion is elastically deformed during the second state.

5. The valve according to claim 4, wherein the elastic contact portion is hollow.

6. The valve according to claim 4, wherein at least one of the valve body and the seat includes a curved contact surface that is in contact with the other of the valve body and the seat.

7. The valve according to claim 1, wherein the seat and the valve body are in contact with each other after at least one of the seat and the valve body of the valve in the open state moves relative to the other of the seat and the valve body in a first direction, and
at least one of the valve body and the seat includes an inclined contact surface that is in contact with the other of the valve body and the seat and is inclined with respect to the first direction.

8. The valve according to claim 7, wherein one of the valve body and the seat includes the inclined contact surface, and
the other of the valve body and the seat includes a curved contact surface.

9. A pressure controlling apparatus comprising:
the valve according to claim 1;
a first channel that is located on one side of the through hole in the seat of the valve, the valve body of the valve being positioned in the first channel;
a second channel that is located on another side of the through hole; and
a movable portion configured to move the valve body by being displaced depending on pressure in the second channel.

10. A liquid ejecting apparatus comprising:
the pressure controlling apparatus according to claim 9;
a pressure regulator configured to increase a pressure in the first channel so as to be larger than a pressure in the second channel of the pressure controlling apparatus; and
a liquid ejecting head configured to eject liquid supplied through the second channel, wherein
the pressure regulator increases the pressure in the first channel to be larger than the pressure in the second channel while the seat and the valve body that is moved due to the displacement of the movable portion are in contact with each other, such that at least one of the seat and the valve body moves relative to the other of the seat and the valve body with the contact between the seat and the valve being maintained.

11. A method of opening and closing a valve including a valve body and a seat having a through hole, the method comprising:
moving at least one of the seat and the valve body relative to the other of the seat and the valve body such that the valve is in one of an open state in order to open the through hole and allow a liquid to pass through the through hole and a closed state in order to close the through hole and not allow the liquid to pass through the through hole; and
moving at least one of the seat and the valve body relative to the other of the seat and the valve body while the valve is in the closed state,
wherein at least one of the valve body and the seat includes an elastic contact portion that is in contact with the other of the valve body and the seat, and the elastic contact portion is elastically deformed during the closed state.

12. The method according to claim 11, wherein the valve is disposed between a first channel located on one side of the through hole and a second channel located on another side of the through hole, the valve body being disposed in the first channel, and
the valve body is moved relative to the seat by a movable portion displaced depending on the pressure in the second channel such that the valve is one of the open state and the closed state.

13. The method of opening and closing the valve according to claim 12, further comprising increasing the pressure in the first channel to be larger than the pressure in the second channel such that the valve body moves relative to the seat during the closed state.

14. The method of opening and closing the valve according to claim 11, wherein the elastic contact portion is hollow.

15. The method of opening and closing the valve according to claim 11, wherein at least one of the valve body and the seat includes a curved contact surface that is in contact with the other of the valve body and the seat.

16. The method of opening and closing the valve according to claim 11, wherein the seat and the valve body are in contact with each other after at least one of the seat and the valve body of the valve in the open state moves relative to the other of the seat and the valve body in a first direction, and
at least one of the valve body and the seat includes an inclined contact surface that is in contact with the other of the valve body and the seat and is inclined with respect to the first direction.

17. The method of opening and closing the valve according to claim 16, wherein one of the valve body and the seat includes the inclined contact surface and the other of the valve body and the seat includes a curved contact surface.

18. A valve comprising:
a seat having a through hole through which a liquid flows; and
a valve body that is configured to be in contact with the seat to close the through hole such that the valve is in a closed state and to be separate from the seat to open the through hole such that the valve is in an open state, wherein
at least one of the seat and the valve body is configured to move relative to the other of the seat and the valve body while the valve is in the closed state,
wherein at least one of the valve body and the seat includes an elastic contact portion that is in contact with the other of the valve body and the seat, and the elastic contact portion is elastically deformed during the closed state.

* * * * *